(No Model.) 6 Sheets—Sheet 1.
C. COLAHAN.
GRAIN BINDER.
No. 315,480. Patented Apr. 14, 1885.
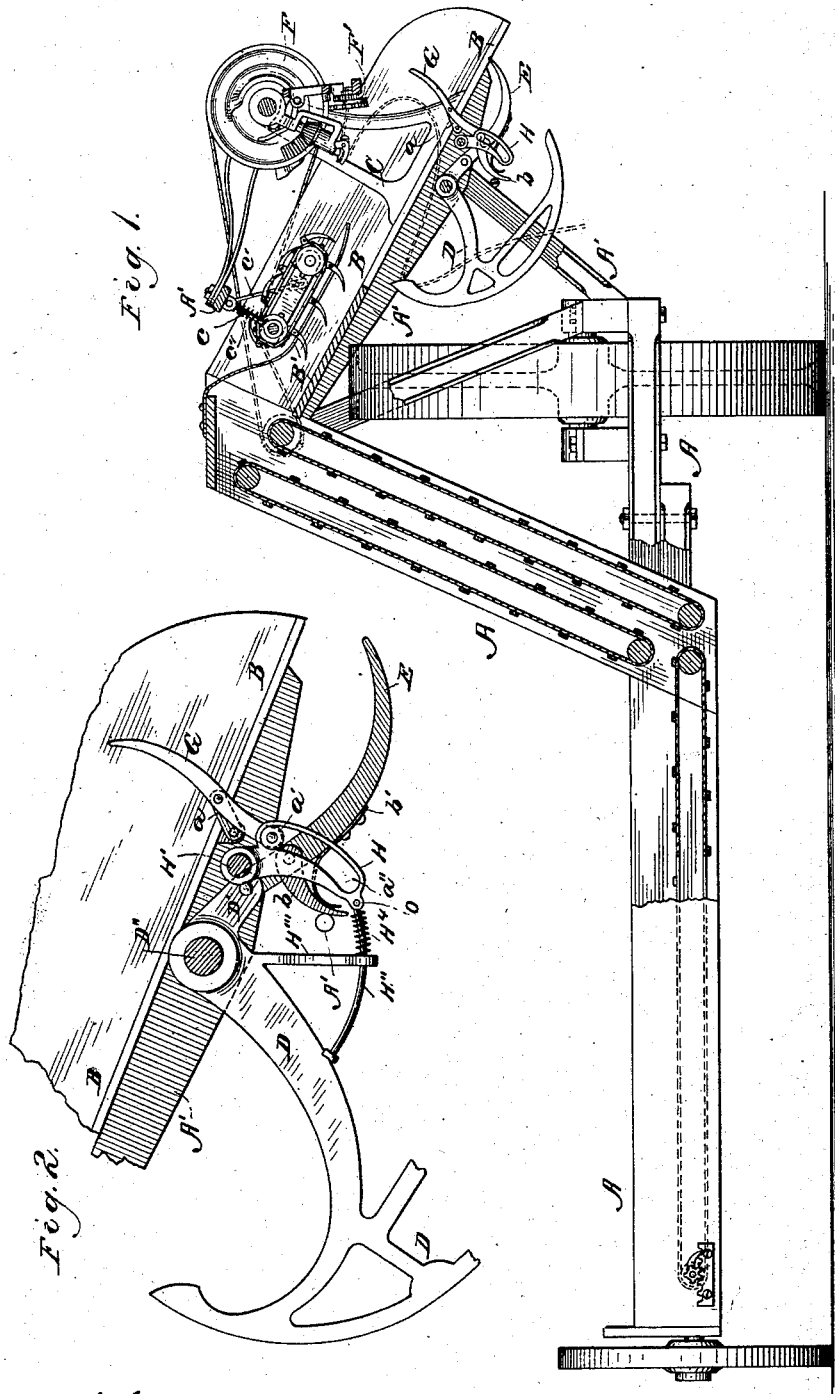
Witnesses.
Henry Frankfurter,
W. S. Baker.
Inventor.
Charles Colahan

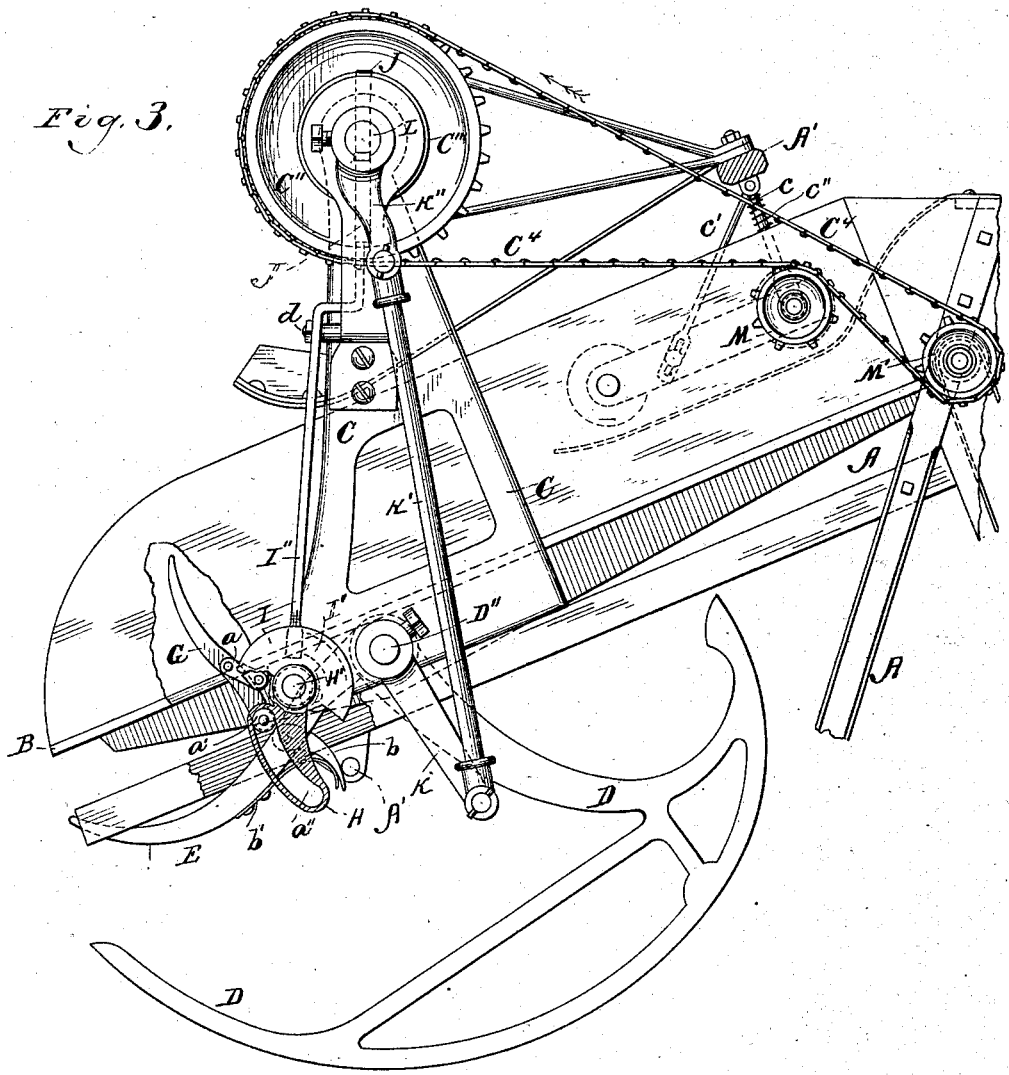

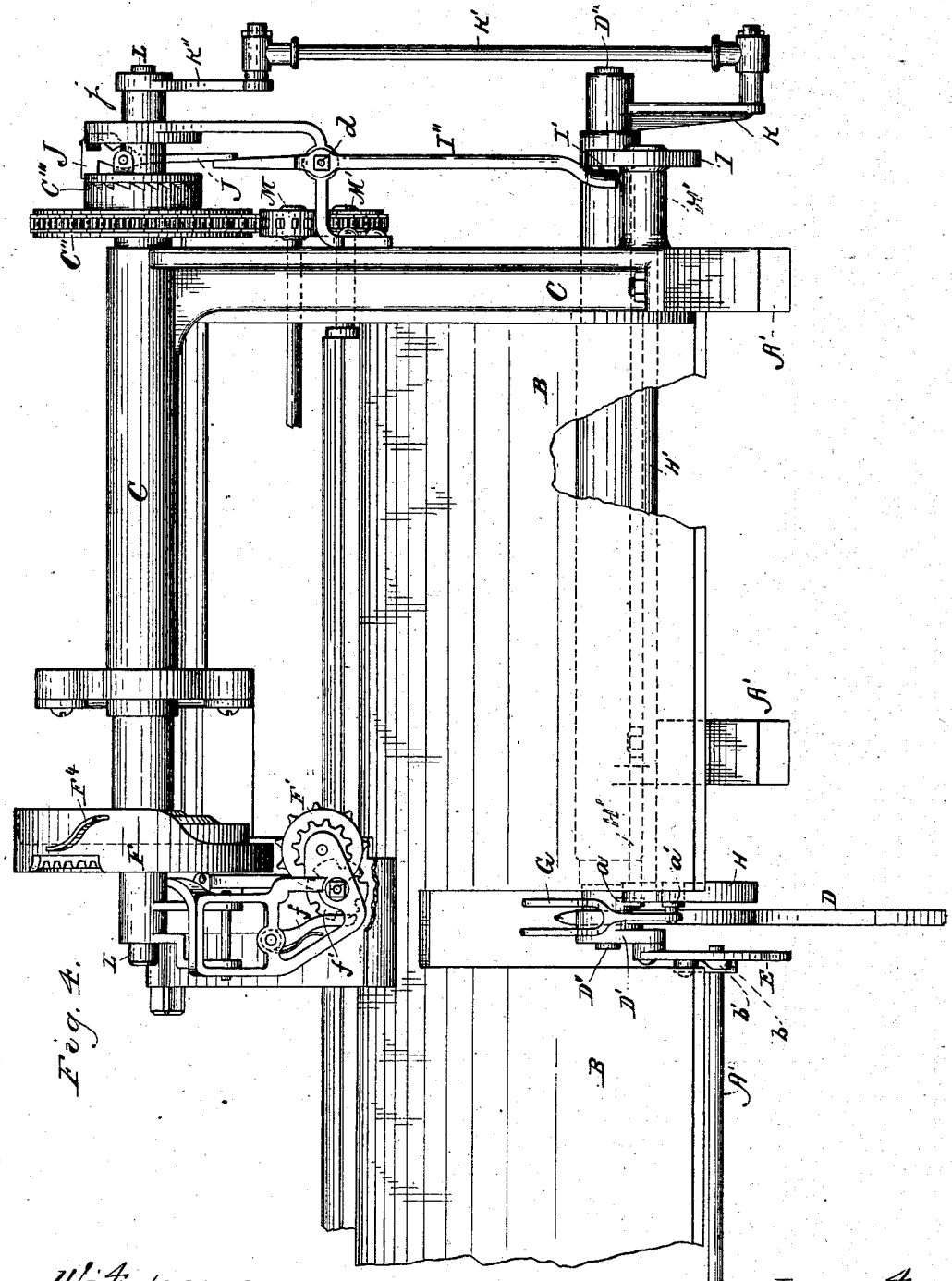

(No Model.) 6 Sheets—Sheet 4.
C. COLAHAN.
GRAIN BINDER.
No. 315,480. Patented Apr. 14, 1885.
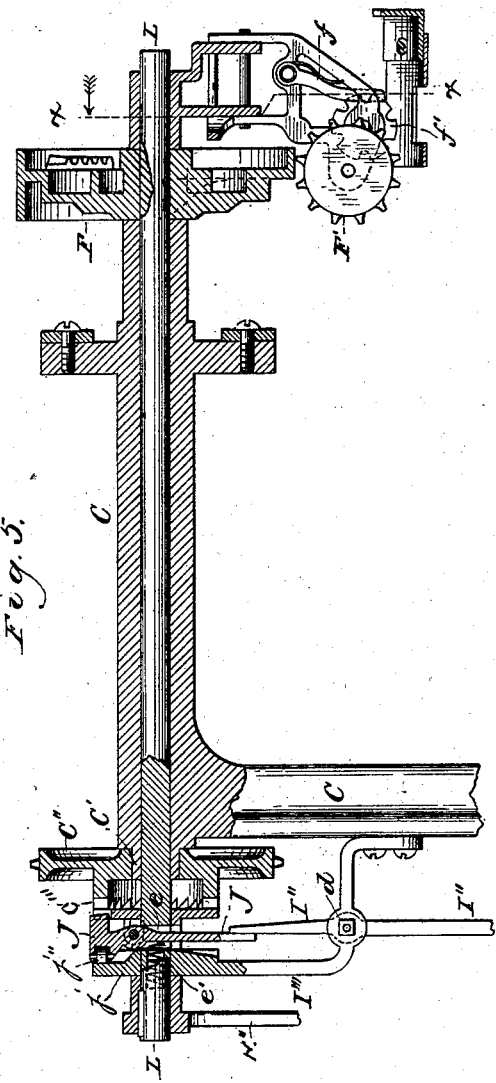
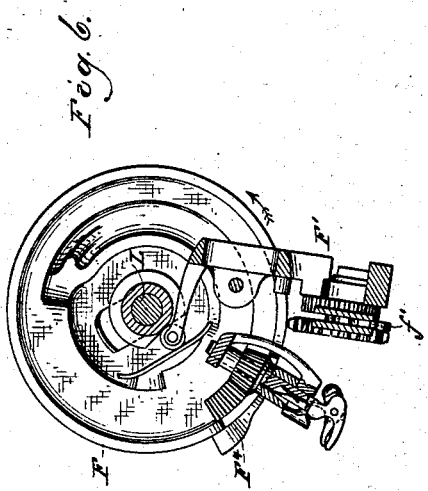
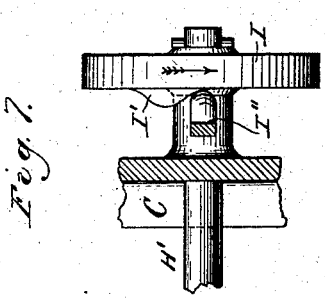
Witnesses. Inventor.

(No Model.)  6 Sheets—Sheet 5.
C. COLAHAN.
GRAIN BINDER.
No. 315,480.  Patented Apr. 14, 1885.
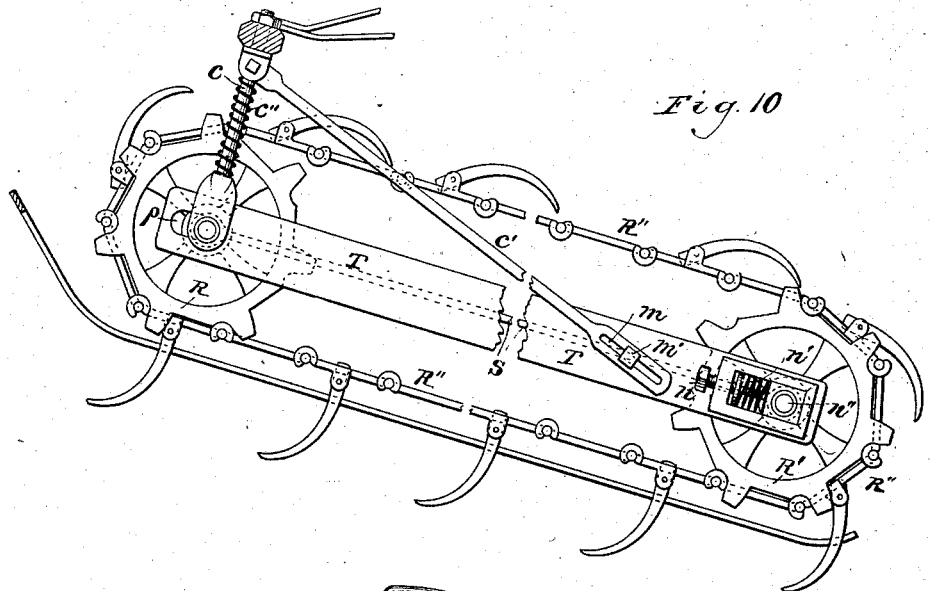
Fig. 10
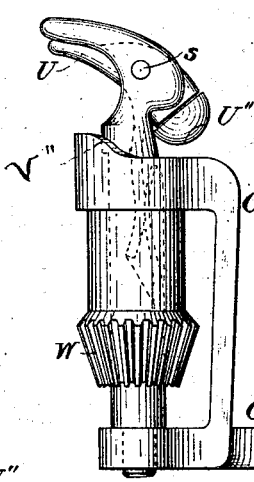
Fig. 11.
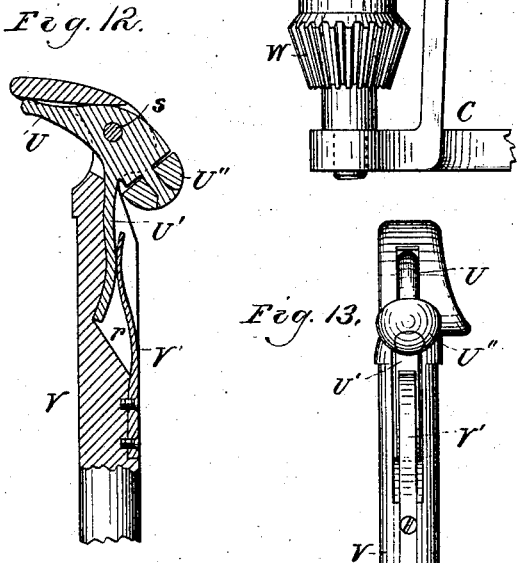
Fig. 12.
Fig. 13.
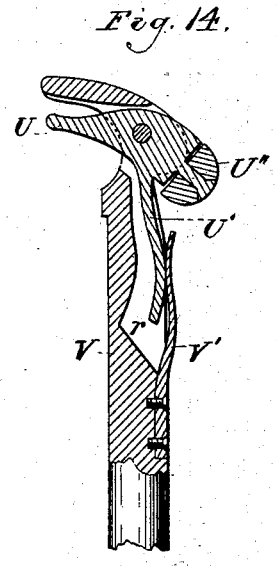
Fig. 14.
Witnesses,  Inventor, (No Model.) 6 Sheets—Sheet 6.

C. COLAHAN.
GRAIN BINDER.

No. 315,480. Patented Apr. 14, 1885.

Witnesses.

Inventor.

UNITED STATES PATENT OFFICE.

CHARLES COLAHAN, OF CLEVELAND, OHIO.

GRAIN-BINDER.

SPECIFICATION forming part of Letters Patent No. 315,480, dated April 14, 1885.

Application filed October 24, 1883. (No model.)

*To all whom it may concern:*

Be it known that I, CHARLES COLAHAN, of Cleveland, Ohio, have invented certain new and useful Improvements in Grain-Binders, of which the following, in connection with the accompanying drawings, to which reference is hereby made, is a specification, in which—

Figure 8:
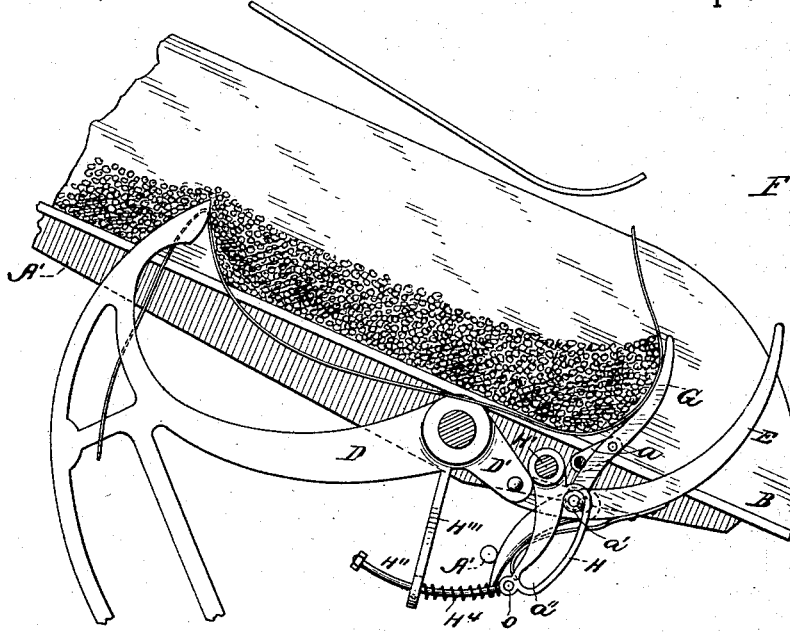
Figure 9:
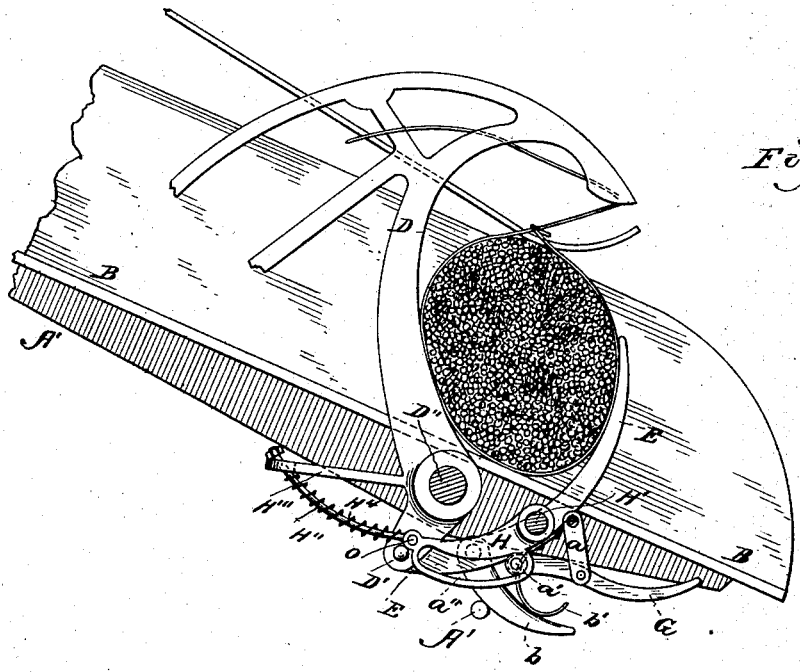

Figure 1 is a rear elevation of a machine embodying my invention. Fig. 2 is a detached end view of the tripping-finger in position to receive the grain. Fig. 3 is a sectional view of the same, showing its operation with the harvester. Fig. 4 is a stubble-side view of the grain-binder. Fig. 5 is a sectional view showing the tripping device in connection with the cord-holder and cam-wheel which operates the band-securing mechanism and the band-carrying shaft. Fig. 6 is a sectional view on line $x\,x$, Fig. 5, of the cam-wheel, cord-holder, and tying-bill. Fig. 7 is a sectional view of the tripping-shaft and its vibrating wheel which operates the tripping-lever. Fig. 8 is a detached plan view of the grain-receiving platform with the binder and compressing-arms entering the same in the process of forming a bundle after the action of the tripping-finger. Fig. 9 shows the bundle formed by means of the compressing and cord-carrying arms and the tripping-arm held below the table to admit the formation and discharge of the bundle. Fig. 10 is a side elevation of the yielding and adjustable packing fingers or rake. Figs. 11, 12, 13, 14 are views of the tying-bill.

This invention consists, principally, in a mechanism that always produces gavels of the same size and an automatic device which will cause the gaveling and binding mechanism to be put in operation when a predetermined quantity of grain shall be accumulated in the receptacle; also, in a rake and packing device which operates in connection therewith, and which may be adjusted in the gathering of desired quantities of grain, and which has the facility of yielding vertically and longitudinally in its function of gathering and packing the grain against the tripping-finger; also, in the construction and operation of a tripping device which may readily yield at the desired moment that the bundle forming and binding mechanism may be brought into action; also, in the peculiar and simple construction and operation of the tying-bill, and other novel features.

In the drawings, A is the main frame of a harvester; A', the binder-supporting frame; B, the receiver; C, the binder-frame. C' is a sleeve upon which the binder-actuating wheel C'' revolves freely when unclutched from the shaft L. C''' is the serrated or ratcheted hub of said wheel C''.

J is a clutch-pawl pivoted in a slot, $e$, to the shaft L.

$e'$ is a spring to force the pawl J out of contact with the hub C''' and into the depression $j''$.

$j$ is a circular plate secured to the arm I'', which is attached to the main frame C, (or it may form a part of said frame,) and to which the lever I'' is pivoted at $d$. The plate $j$ has a depression, $j''$, therein, wherein the heel of the pawl J and its friction-roller recede by the force of spring $e'$ upon each revolution of the binder-shaft L at the moment it unclutches from the wheel C'', and is retained therein.

F is the main cam and gear-wheel actuating the cord holding and tying devices. F' is a gear-wheel actuating the cord-holding disk $f'$, which seizes the cord from the binder-arm, and when revolved by the curved tooth $F^4$, coming in contact therewith, carries the cord into the grooved yielding shoe $f$, wherein it is held in the usual manner.

The tying-bill or knotter, as shown in Figs. 1 and 6, is supported in the usual manner on the frame C from the shaft L. This knotter is constructed and operated as follows: The usual form of pivoted jaw, U, is pivoted at S, and has an extended arm reaching up into the main shaft of the knotter within a slot, $r$. Said slot $r$ is entirely inside of said knotter-shaft and its pinion W, and serves to keep the pivoted jaw normally closed without other mechanism, while it is very simple and compact in its construction. The cam V'' will cause the friction-roller commonly used on said knotter-jaw to force the pivoted jaw open at the proper moment as it is revolved by the main cam and gear-wheel F, and to seize the ends of the cord and tie the same at each revolution, in the usual manner.

D is the binder-arm. D' is the heel-extension thereof on the binder-arm shaft D''.

E is the compressor-arm secured loosely to the heel D' of the binder-arm, and fulcrumed on the pivoted arm b, which is pressed up by the spring b' when the binder-arm is rocked forward.

G is the tripping-finger secured to the rising-and-falling link a, said link being free to vibrate at its point of attachment to the under side of the binder-table, also at its point of attachment to the tripping-finger, with which it rises and falls. The lower end of said tripping-finger is provided with a friction-roller, a', which is controlled and guided by a slot or groove, a'', in which it operates in the tripping-cam crank-arm H, which is secured to the tripping-shaft H'. Said tripping-cam crank-arm H has an adjustable curved spring-rod, H'', pivoted thereto at o. Said rod passes loosely through an arm, H''', which is a part of the binder-arm, which is secured to and actuated by the shaft D''. The spiral spring H$^4$ admits of the yielding of the cam crank-arm H against the stationary position of the binder-arm or its shaft during the formation of the bundle, and when the binder is set in operation and the binder-arm rocks forward and upward the arm H''' will carry the rod H'', which is pivoted at o to the crank-arm H, and cause the withdrawal of the tripping-finger G below the surface of the table while the bundle is being formed and discharged, when the finger will be caused to resume its normal position, and the binder-arm shall rock back to permit the grain to enter the binder for another bundle.

H' is the tripping rock-shaft.

I is a cam-disk.

I' is the cam projection thereon.

I'' is the tripping-lever pivoted at d on the arm attached to or forming part of main frame C. The upper end of the tripping-lever I'' is brought in contact with the clutching-pawl J, as hereinafter described.

K is the binder-arm shaft-crank. K' is the pitman secured thereto, and actuated by the crank K'', which is secured to the main shaft L.

The packing-chain rake used is shown in patent to Dickey, No. 276,008, April 17, 1883, which permits the teeth to fold back as soon as the chain is bent in passing around one of the sprocket-wheels in rising out of the grain, and the teeth assume a vertical position when the teeth again enter the grain on its return over the opposite sprocket-wheel, and are so retained against the resistance of the grain by its heel projection coming in contact with the following link, as shown in said patent.

T is the frame supporting said packing device. C is a pendent bracket or support sustaining the shaft of sprocket-wheel R and secured loosely to the binder-frame A', and which, with the adjustable brace-rod c', secures the packing device to the machine.

m is a slot; m', a bolt secured therein for adjustment of the parts.

c'' is a spring, which admits of the upward yielding of the packing-fingers and their supporting-frame under the pressure of unequal quantities of inflowing grain. The sprocket-wheels carrying the packing-chain and its teeth are supported in boxes or bearings, which are also permitted to yield lengthwise the frame, and are provided this facility by means of slots in their supporting-frame T, the lower end of which, where the greatest pressure is offered, is provided with a spring, n', and set-screw n, to adjust the journal n'', the journals or bearings of said sprocket-wheels being secured in relative fixed positions by means of a rod, S, uniting the same, as shown in dotted lines, Fig. 10. The slot P in the bar T at the upper end permits the required movement at this point as the packer yields, as before stated.

I have shown the packing device to be actuated by the chain C$^4$, which also actuates the binding mechanism. Said chain has motion imparted to it by the sprocket-wheel M', secured to the main frame A of the harvester.

In operation the binder is secured to a harvester that is constructed with a low elevator, which will deliver the grain at a point over the main harvester-wheel, and the packers are extended to any desired length in order to gather, and while packing the grain into the binder, the packers having a yielding action, as described, in operation upon the grain will not thrash the grain from the straw, as in the use of fixed positive gathering-fingers, and when a sufficient quantity of grain shall have accumulated against the tripping-finger said tripping-finger will gradually recede or rock back on its vibrating link a, while its friction-roller a' will travel down in the slot a'' in the tripping crank-arm H, and, finally, under the varied pressure of any and all conditions of grain will, at the desired moment, invariably cause the tripping crank-arm to rock the shaft H' and partially rotate the cam-disk I and bring the cam projection I' in contact with the tripping-lever I'', and cause said lever to vibrate on its pivot d, and by the force of its pressure against the clutch-pawl J said pawl will be forced from its depression j'' in the plate j, and the point thereof will engage the serrated or ratcheted hub C''' of the power-wheel C'', and being held in connection therewith by the plate j as the friction-roller of the pawl J travels thereon during the revolution of the binder-shaft and the formation of the bundle, when said pawl J and its friction-roller will reach the depression j'' and unclutch the binder, when all parts again assume their normal position.

Having thus described the construction and operation of my invention, what I claim, and desire to secure by Letters Patent, is—

1. In combination with an automatic grain-binder, a packing-chain rake, its frame, and supports which adapt it to yield vertically and longitudinally, whereby the grain may be gathered into the receiver without liability of thrashing it from the straw in the process of forming the gavel.

2. The combination of the receiver B and the automatic grain-binder with the yielding adjustable gathering and packing rake R''', constructed and operating as shown and described.

3. In a grain-binder, the sprocket-rake-carrying wheels R and R', with their axles secured in relative fixed positions by the rod S, combined with adjustable longitudinal spring n' and the supporting-frame T, as shown and described.

4. In a grain-binder, the combination of a yielding tripping-finger against which the grain is steadily packed by a rake, a binder-arm, an independent compressor, and means connecting the compressor and the tripping-finger with the binder-arm, whereby when the binder-arm is set into motion it will cause the tripping-finger to recede from the grain-receptacle.

5. In a grain-binder, the binding-arm and its shaft D'', actuating the compressor, in combination with the tripping mechanism, operating substantially as shown and described.

6. In a grain-binder, the tripping-finger G, connected by means of arms H and rod H'' to arm H''', and compressor E, pivoted to arm D, and combined with the binder-arm or its shaft, whereby the tripping-finger and compressor are alternately brought in contact with the grain in the grain-receptacle, substantially as shown, and for the purposes shown and described.

7. The combination, with the tripping-finger G, its rocking pivotal link a, its cam crank-arm H, with its rock-shaft H', and cam-disk I, for moving the shipping-lever I'' and causing the pawl J to engage the ratchet C''' of the power-wheel C'' to start the binder, substantially as shown and described.

8. The combination of the power-wheel C'', its ratchet-hub C''', with the shaft L and its clutching-pawl J, secured thereto, and the lever I'', and mechanism for tripping the lever, whereby the binder is set in operation, substantially as shown and described.

9. The combination of the binder-arm D with the arm H''', the rod H'', spring H⁴, crank H, and tripping-finger G, substantially for the purposes described.

10. The combination of the tripping-finger G, pivoted on its swinging link a, its friction-roller a', traveling in the cam slot or groove a'', of the rocking crank H and its shaft H', and lever-shifting disk I, operating to move the clutch-lever I'', substantially as shown and described.

11. The combination, in a tying-bill, of the slotted shaft V, journaled in the supporting-frame C, the cam V'', the pinion W, the pivoted finger or jaw U, and shank-extension U', the spring v', operating within said supporting-frame and gear-wheel, and the main cam and gear wheel F, as shown and described.

12. The tying-bill supported in the frame C, the cam V'', for opening the pivoted jaw U, and the shank-extension U' of said jaw, by which it is closed, vibrating within the frame and rocking on its pivot s at each revolution of the main cam and gear wheel F, as shown and described.

13. The tying-bill, its moving jaw U, pivoted at s, and the friction-roller U'', its shank-extension U', the slot r, and spring V', constructed and operating as described.

CHARLES COLAHAN.

Witnesses:
CHARLES K. OFFICER,
FREDERICK C. GOODWIN.